(12) United States Patent
Sakurai et al.

(10) Patent No.: US 11,136,473 B2
(45) Date of Patent: Oct. 5, 2021

(54) FLUORINE-CONTAINING COATING FILM AND WATER- AND OIL-REPELLENT COATING COMPOSITION

(71) Applicant: SUMITOMO CHEMICAL COMPANY, LIMITED, Tokyo (JP)

(72) Inventors: Sayaka Sakurai, Osaka (JP); Yasuharu Shimazaki, Osaka (JP); Hidekazu Yoshida, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 16/069,076

(22) PCT Filed: Jan. 10, 2017

(86) PCT No.: PCT/JP2017/000422
§ 371 (c)(1),
(2) Date: Jul. 10, 2018

(87) PCT Pub. No.: WO2017/122616
PCT Pub. Date: Jul. 20, 2017

(65) Prior Publication Data
US 2019/0048229 A1 Feb. 14, 2019

(30) Foreign Application Priority Data
Jan. 12, 2016 (JP) .............................. JP2016-003719

(51) Int. Cl.
*B32B 3/26* (2006.01)
*C09D 183/12* (2006.01)
(Continued)

(52) U.S. Cl.
CPC ........... *C09D 183/12* (2013.01); *C08G 77/24* (2013.01); *C08G 77/46* (2013.01); *C08L 83/04* (2013.01);
(Continued)

(58) Field of Classification Search
CPC .. C09D 183/04; C09D 183/08; C09D 183/12; C09D 5/16; C09D 5/1637; C09D 5/165;
(Continued)

(56) References Cited

U.S. PATENT DOCUMENTS 3,442,664 A * 5/1969 Heine ...................... C08L 83/08
428/429
4,567,073 A * 1/1986 Larson ................. C08G 65/007
428/40.7
(Continued)

FOREIGN PATENT DOCUMENTS

CN 104364294 A 2/2015
JP 5-96679 A 4/1993
(Continued)

OTHER PUBLICATIONS

International Search Report, issued in PCT/JP2017/000422, PCT/ISA/210, dated Apr. 18, 2017.
(Continued)

*Primary Examiner* — Megha M Gaitonde
(74) *Attorney, Agent, or Firm* — Birch, Stewart, Kolasch & Birch, LLP

(57) ABSTRACT

It is an object of the present invention to provide a coating film capable of realizing satisfactory sliding properties in addition to water- and oil-repellent properties and wear resistance evaluated by a static contact angle, and a coating composition for obtaining the coating film.
The present invention is directed to a fluorine-containing coating film which has a root mean square roughness of less than 3.5 nm and has a perfluoropolyether structure. It is preferred that the coating film has a polysiloxane backbone and further has a structure in which a fluoroalkyl group is directly bonded to a silicon atom of the polysiloxane backbone, and that a sliding angle of 6 µL of a water droplet is
(Continued)

24.3° or less, or a speed of 20 μL of a water droplet sliding on a coating film inclined at 32° is 0.1 cm/second or more.

6 Claims, 1 Drawing Sheet

(51) Int. Cl.
 C08L 83/04 (2006.01)
 C09D 5/16 (2006.01)
 C09D 7/65 (2018.01)
 C09D 183/08 (2006.01)
 C09D 7/20 (2018.01)
 C08G 77/24 (2006.01)
 C08G 77/46 (2006.01)
 C09D 5/00 (2006.01)
 C08G 77/20 (2006.01)
 C08L 83/14 (2006.01)
 C08G 77/50 (2006.01)
 C08G 77/00 (2006.01)

(52) U.S. Cl.
 CPC ............. *C09D 5/00* (2013.01); *C09D 5/1637* (2013.01); *C09D 7/20* (2018.01); *C09D 7/65* (2018.01); *C09D 183/08* (2013.01); C08G 77/20 (2013.01); C08G 77/50 (2013.01); C08G 77/70 (2013.01); C08G 2150/00 (2013.01); C08L 83/14 (2013.01)

(58) Field of Classification Search
 CPC ..... C09D 171/02; B32B 27/18; B32B 27/283; B32B 27/285; C08L 83/04; C08L 83/08; C08L 83/12; C08L 183/12; C08L 71/02; C08G 77/04; C08G 77/14; C08G 77/20; C08G 77/24; C08G 77/42; C08G 77/46; C08G 77/50; C08G 77/70; C08G 2150/00; Y10T 428/24479; Y10T 428/24612; Y10T 428/24942; Y10T 428/2495; Y10T 428/24967; C09J 183/12; C09J 183/08
 USPC .......................... 428/156, 172, 212, 213, 215
 See application file for complete search history.

(56) References Cited

U.S. PATENT DOCUMENTS

| | | | |
|---|---|---|---|
| 5,225,274 A | 7/1993 | Ogawa et al. | |
| 2008/0286527 A1* | 11/2008 | Haga | G02B 5/0221 |
| | | | 428/143 |
| 2015/0004419 A1 | 1/2015 | Yamane et al. | |
| 2015/0118502 A1* | 4/2015 | Mitsuhashi | C08G 65/336 |
| | | | 428/429 |
| 2015/0275035 A1 | 10/2015 | Yamane et al. | |
| 2017/0015842 A1* | 1/2017 | Hozumi | C09D 183/04 |
| 2017/0197875 A1* | 7/2017 | Fujii | C03C 17/42 |
| 2017/0313905 A1 | 11/2017 | Harada et al. | |
| 2018/0230331 A1* | 8/2018 | Harada | C09D 183/08 |

FOREIGN PATENT DOCUMENTS

| | | | | |
|---|---|---|---|---|
| JP | 9-137117 A | | 5/1997 | |
| JP | 11-171594 A | | 6/1999 | |
| JP | 2014-15609 A | | 1/2014 | |
| JP | 2015-10209 A | | 1/2015 | |
| JP | 5716663 B2 | | 5/2015 | |
| JP | 2015-199915 A | | 11/2015 | |
| WO | WO 2010/125926 A1 | | 11/2010 | |
| WO | WO2015/125866 | * | 8/2015 | |
| WO | WO 2015/125866 A1 | | 8/2015 | |
| WO | WO 2016/076245 A1 | | 5/2016 | |
| WO | WO 2016/076274 A1 | | 5/2016 | |
| WO | WO-2016076245 A1 | * | 5/2016 | ........... C09D 5/1606 |

OTHER PUBLICATIONS

Japanese Notice of Reasons for Refusal dated Jan. 7, 2020, for corresponding Japanese Patent Application No. 2016-003719, with English translation.
Chinese Office Action for Chinese Application No. 201780006173.6, dated Jun. 24, 2020, with an English translation.
Taiwanese Office Action and Search Report dated May 18, 2020 for Application No. 106100714 with an English translation of the Office Action.
Chinese Office Action for Chinese Application No. 201780006173.6, dated Jan. 4, 2021, with English translation.

\* cited by examiner

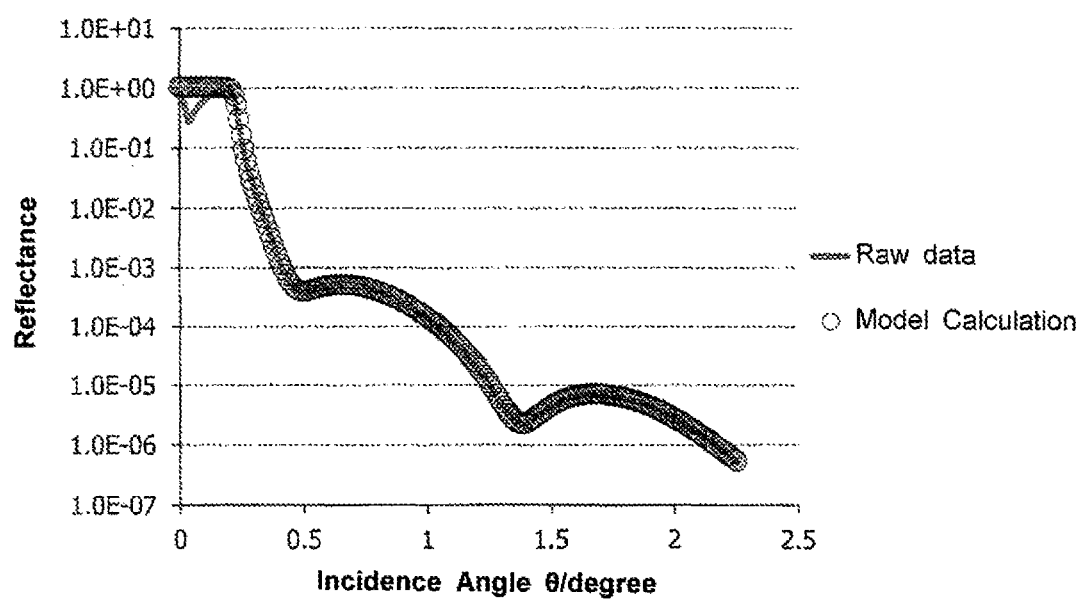

FLUORINE-CONTAINING COATING FILM AND WATER- AND OIL-REPELLENT COATING COMPOSITION

TECHNICAL FIELD

The present invention relates to a fluorine-containing coating film and a water- and oil-repellent coating composition.

BACKGROUND ART

Applications of coating films having water and oil repellency, such as window glasses of automobiles and buildings are required to have abrasion resistance of the coating in addition to water- and oil-repellent functions.

For example, in Patent Document 1, a contact angle of water of a fluorine-containing organosilicon compound film in a state of coating a main surface of a transparent substrate and a contact angle of water after a durability test are evaluated.

PRIOR ART DOCUMENT

Patent Document

Patent Document 1: JP 9-137117 A

DISCLOSURE OF THE INVENTION

Problems to be Solved by the Invention

In applications such as automobiles and window glasses as mentioned above, in addition to a static contact angle of water and its durability (abrasion resistance) as evaluated in the above-mentioned Patent Document 1, dynamic characteristics such as slipperiness (sliding property) when liquid droplets slide on an inclined coating film in sliding are also required.

It is an object of the present invention to provide a coating film capable of realizing satisfactory sliding properties in addition to water- and oil-repellent properties and wear resistance evaluated by a static contact angle, and a coating composition for obtaining the coating film.

Means for Solving the Problems

The present invention is directed to a fluorine-containing coating film which has a root mean square roughness of less than 3.5 nm and has a perfluoropolyether structure. It is preferred that the fluorine-containing coating film has a polysiloxane backbone and further has a structure in which a fluoroalkyl group is directly bonded to a silicon atom of the polysiloxane backbone. It is preferred that the fluorine-containing coating film has a polysiloxane backbone and has the perfluoropolyether structure on the free end side of a silicon atom of the polysiloxane backbone. The fluorine-containing coating film has a thickness of, for example, 4 nm or more and 100 nm or less.

In the fluorine-containing coating of the present invention, it is preferred that a sliding angle of 6 μL of a water droplet is 24.3° or less, or a speed of 20 μL of a water droplet sliding on a coating film inclined at 32° is 0.1 cm/second or more. In the fluorine-containing coating film of the present invention, a density of an outermost surface layer of the fluorine-containing coating film measured by an X-ray reflectivity method is preferably 1.6 g/cm$^3$ or more.

The present invention also includes a water- and oil-repellent coating composition including a compound (A) in which a group having a perfluoropolyether structure and a hydrolyzable group are bonded to a silicon atom; and at least one of a fluoroalkylsilane (B1) and a hydrolyzable silane oligomer (B2); which are dissolved in a fluorine-based solvent (C), wherein a second fluorine-based solvent (D) different from the fluorine-based solvent (C) is further dissolved in the composition. The number of carbon atoms of the second fluorine-based solvent (D) is preferably 10 or more.

The compound (A) is preferably a compound represented by the following formula (1):

[Chemical Formula 1]

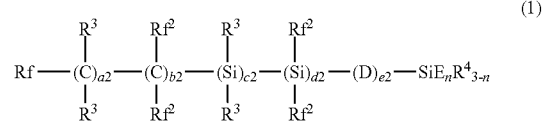

wherein, in formula (1), Rf represents a fluorine atom or an alkyl group having 1 to 20 carbon atoms substituted with at least one fluorine atom; Rf$^2$ each independently represents a fluorine atom or an alkyl group having 1 to 20 carbon atoms substituted with at least one fluorine atom; R$^3$ each independently represents a hydrogen atom or an alkyl group having 1 to 4 carbon atoms; R$^4$ each independently represents an alkyl group having 1 to 20 carbon atoms when plural R$^4$ (s) exist; D each independently represents —O—, —COO—, —OCO—, —NR—, —NRCO—, or —CONR— when plural D(s) exist, in which R represents a hydrogen atom, an alkyl group having 1 to 4 carbon atoms, or a fluorine-containing alkyl group having 1 to 4 carbon atoms; E each independently represents a hydrolyzable group when plural E(s) exist; a2, b2, c2, d2 and e2 each independently represents an integer of 0 or more and 600 or less, and the total value of a2, b2, c2, d2 and e2 is 13 or more; and n is an integer of 1 or more and 3 or less.

The compound (A) is preferably at least one of a compound represented by the following formula (2) and a compound represented by the following formula (2'):

[Chemical Formula 2]

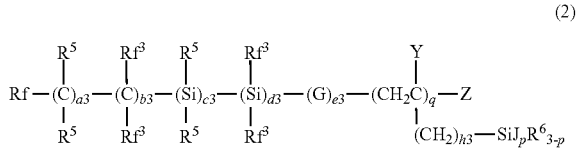

wherein, in formula (2), Rf represents a fluorine atom or an alkyl group having 1 to 20 carbon atoms substituted with one or more fluorine atoms; Rf$^3$ each independently represents a fluorine atom or an alkyl group having 1 to 20 carbon atoms substituted with one or more fluorine atoms; R$^5$ each independently represents a hydrogen atom or an alkyl group having 1 to 4 carbon atoms; R$^6$ each independently represents an alkyl group having 1 to 20 carbon atoms; G each independently represents —O—, —COO—, —OCO—, —NR—, —NRCO—, or —CONR— when plural G(s) exist, in which R represents one selected from the group consisting of a hydrogen atom, an alkyl group having 1 to 4 carbon atoms, and a fluorine-containing alkyl group having 1 to 4 carbon atoms; J each independently represents a hydrolyzable group when plural J(s) exist; Y each independently represents a hydrogen atom or an alkyl group having 1 to 4 carbon atoms when plural Y(s) exist; Z represents a hydrogen atom or a halogen atom; a3, b3, c3, d3 and e3 each independently represents an integer of 0 or more and 600 or less, and the total value of a3, b3, c3, d3 and e3 is 13 or more; h3 is an integer of 0 or more and 2 or less; q is an integer of 1 or more and 20 or less; and p is an integer of 1 or more and 3 or less; and

[Chemical Formula 3]

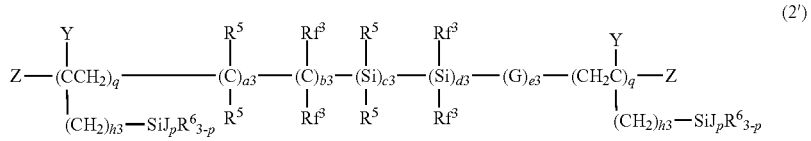

(2')

wherein, in formula (2'), a3 to e3, h3, p, q, $Rf^3$, $R^5$, $R^6$, J, Y and Z are the same as defined in the formula (2).

Effects of the Invention

Since root mean square roughness of a fluorine-containing coating film is adjusted to less than a predetermined value, the coating film of the present invention is excellent in water repellency and oil repellency and is excellent in abrasion resistance, and is also satisfactory in sliding properties evaluated by a sliding angle of a water or oil droplet and a sliding speed of a water droplet.

BRIEF DESCRIPTION OF THE DRAWINGS

FIG. 1 is a graph showing an example of a fitting treatment in XRR measurement.

MODE FOR CARRYING OUT THE INVENTION

The coating film of the present invention is a fluorine-containing coating film which has a root mean square roughness (hereinafter referred to as RMS) of less than 3.5 nm and has a perfluoropolyether structure mentioned below. Surface roughness evaluated by RMS of less than 3.5 nm leads to satisfactory abrasion resistance and sliding properties. RMS is preferably 3.0 nm or less, more preferably 2.5 nm or less, and still more preferably 2.0 nm or less. The lower limit of RMS is not particularly limited and is, for example, 0.3 nm.

The mechanism of abrasion of the coating film is not necessarily clarified but is considered as follows: if there are irregularities in aggregates formed by bonding components in a transparent coating film to each other by a silane coupling reaction, physical adsorption to pores in an abrasion agent (capillary phenomena, etc.) may occur or stress may be applied to the coating film as a result of being caught by the irregularities on a surface of the abrasion agent, resulting in removal of the coating film together with the abrasion agent. Therefore, it is possible for the transparent film of the present invention in which a fine convex portion existing on the surface of the coating film has low height, i.e., the surface of the coating film has low roughness (specifically, RMS is less than 3.5 nm) to achieve satisfactory abrasion resistance.

In the calculation of RMS, an image of 100 μm² obtained by observing the surface of the coating film using a dynamic force mode (DFM) of a scanning probe microscope (SPM) is used. The image is subjected to image processing (primary inclination correction and secondary inclination correction, and flat correction), and the maximum valley depth (Rv) and RMS can be calculated using the roughness analysis function for the image after image processing.

RMS refers to a square root of an average value of the squares of deviations from an average line to a measurement curve and is obtained from a roughness curve, and a peak refers to that in which the distance to the measurement curve exceeds the root mean square roughness (RMS) based on the average line.

In other words, the transparent coating film of the present invention can also be said to be a coating film having a small coating area ratio (AR) of the convex portion higher than the value of 2 nm from an average plane of irregularities on a surface of the coating film. When two substances come in physical contact with each other and move parallel to the contact surface, as mentioned above, irregularities existing on the contact surface can contribute to rubbing or abrasion accompanied by the separation of the substance. Also, in the transparent coating film of the present invention, if irregularities exist on the contact surface, it is considered that the irregularities serve as a resistance component. When the height of the convex portion on the surface of the transparent coating film and the depth of the concave portion on the surface of the substance (eraser, metal, human hand, etc.) in contact with the transparent coating film exceed a certain threshold value, the irregularities conflict with each other and serve as the resistance component, thus exerting an adverse influence on the abrasion resistance.

Usually, the surface of a flat substrate, a film, a resin, or metal used for a smooth transparent coating film have irregularities of about 0.1 to 1 nm. The surface of metal, a rubber, or a human hand as a substance, which comes into contact with the transparent film and undergoes abrasion, may also have irregularities of 0.1 to 1 nm or several μm. From this fact, it is considered that, if the convex portion exceeding 2 nm, which exceeds by far the irregularities of at least the base material of the transparent coating film, exists, the irregularities collide with the concave portion of the contact object and serve as the resistance component, thus exerting an adverse influence on the abrasion resistance. Therefore, it is possible to evaluate the abrasion resistance of the coating film by calculating the coating area ratio (AR) of the convex portion higher than the value of 2 nm from the average plane of the irregularities of the film.

A description will be made of the procedure for calculating the coating area ratio AR of the convex portion higher than the value of 2 nm from the average plane of irregularities on the surface of the coating film. The plane of the coating film is defined as the XY axis plane and the thickness direction of the coating film is defined as the Z axis, and the lowest position of the irregularities of the coating film is defined as the origin of the Z axis (Z=0). From the average plane of the irregularities of the surface of the coating film, a cross-sectional image of the XY plane is formed in the Z axis coordinate higher by 2 nm in the Z axis direction, and it is possible to calculate AR by image analysis using the roughness analysis software in combination with the particle analysis function.

$Z_0$ represented by the following formula (X1) using the maximum valley depth Rv is the value of the Z axis of the average plane (sometimes referred to as the surface of the membrane) of the membrane and Z represented by the following formula (X 2) is input to the particle analysis function as the threshold value to obtain the particle area ratio. The particle area ratio thus obtained is a cross-sectional area when the convex portion existing in the coating film is cut along the XY plane which is 2 nm higher in the Z-axis direction from the average plane of the coating film, and this is a coating area ratio (AR) [unit: %] of the convex portion which is 2 nm higher from the average plane of the coating film. AR is less than 6.9%, preferably less than 6.8%, more preferably 5.5% or less, and still more preferably 3.5% or less. The lower limit of AR is not particularly limited and is, for example, 0.5%.

$$Z_0(nm)=\{(R_v)^2\}^{1/2} \qquad (X1)$$

$$Z(nm)=Z_0+2 \qquad (X2)$$

When a cross-sectional shape of the convex portion existing in the coating film, cut along the XY plane which is 2 nm higher than the average plane of the coating film in the Z axis direction, is called the particle, an average particle diameter obtained by averaging the equivalent circle diameter calculated from the area of each particle is, for example, 200 nm or less, preferably 100 nm or less, and more preferably 90 nm or less. The lower limit of the average particle size is not particularly limited and is, for example, 40 nm.

The image processing (primary inclination correction, secondary inclination correction, and flat correction) is a processing of correcting the shape image obtained by the measurement with respect to the inclination, deflection, or distortion of the sample substrate. The inclination of the sample is caused by relative inclination between the sample and the needle, and it is considered that the distortion of the sample is caused by drift or vibration of the sample, creep of the scanner or the like. Primary inclination correction is correction in which a primary curved surface (plane) is determined by least squares approximation from all data of the image to be processed to perform fitting, and the inclination in the plane is corrected. The secondary inclination correction is correction in which a secondary curved surface (plane) is determined by least squares approximation from all data of the image to be processed to perform fitting, and the inclination in the plane is corrected. The flat correction is correction in which distortion and undulation in the Z direction generated in the image data by drift, vibration, creep of the scanner or the like are removed. These image corrections affect the values of the maximum valley depth (Rv), RMS, Ra and the like in the above roughness analysis and particle analysis, so that there is a need to perform appropriate processing.

The above-mentioned appropriate processing means processing in which, when the concave-convex portion having the following features exists at the end of the observation image, data of the concave-convex portion are removed. This is because when the following concave-convex portion exists, the inclination is not excessively estimated or the inclination is not taken into consideration in statistical processing.

As the derivation of the concave-convex portion, for example, accidentally adhered contaminants, aggregates containing a transparent coating film and the like are conceivable. The concave-convex portion is characterized by being the highest or lowest in the scanning direction of the scanning probe and the direction perpendicular to the in-plane scanning direction with respect to the coordinates of the screen edge of the observation image. However, when the height of the concave-convex portion is equal to the height of the concavo-convex portion at the center of the observation surface, there is no need to exclude the data.

Generally, arithmetic average roughness (Ra) in accordance with JIS R 1683 (2007) is used as an indicator of the surface shape, but Ra is a numerical value representing average depth information over the entire surface and, in the present invention, it is not necessarily sufficient as an indicator for evaluation of the shape and the number of a local convex structure. Even if a large convex or concave portion locally exists in the surface, the portion is averaged in the evaluation using Ra and is not easily regarded as a difference of the numerical value. However, from the viewpoint of practical use, if the local convex or concave portion exists on the surface, water and oil are easily caught at that point, leading to deterioration of the water and oil repellency. Scratches are formed from the local convex or concave portion as the starting point during an abrasion test, and thus the abrasion resistance is likely to deteriorate. When the surface shape of the coating film is evaluated by RMS, a difference in value between the case where the local convex or concave portion exists and the case where the local convex or concave portion does not exist is larger than that when the surface shape is evaluated by Ra, so that it is more preferable as evaluation criteria of film quality of the present invention.

As mentioned above, the coating film of the present invention, in which RMS is adjusted to less than 3.5 nm, is excellent in sliding properties. The sliding property can be evaluated by the sliding angle of a water droplet, i.e., an angle at which the water droplet begins to slide when inclining a coating film to which the water droplet is adhered, or a rate at which the water droplet slides down on a coating film inclined at a predetermined angle. In the coating film of the present invention, the sliding angle of 6 μL of the water droplet can be adjusted to 24.3° or less, or the rate at which 20 μL of the water droplet sliding down on the coating film inclined at 32° can be adjusted to 0.1 cm/sec or more and, preferably, it is possible to satisfy both requirements of the sliding angle and the sliding speed. The sliding angle is preferably 24.0° or less, more preferably 23.0° or less, and still more preferably 20.0° or less. The lower limit of the sliding angle is not particularly limited and is, for example, 5.0°. The sliding speed is preferably 0.5 cm/sec or more, more preferably 1.0 cm/sec or more, and still more preferably 5.0 cm/sec or more. The upper limit of the sliding speed is not particularly limited and is, for example, 30.0 cm/sec.

In the coating film of the present invention, the sliding angle of 4.0 μL of the oil droplet (hexadecane) can be adjusted to 13.0° or less, preferably 11.0° or less, and more preferably 9.0° or less. The lower limit is not particularly limited and is, for example, 3.0°.

The value of the arithmetic average roughness Ra of the coating film of the present invention is not particularly limited and Ra is, for example, about 0.1 to 1.0 nm, which is about the same as that of the glass base material. Therefore, it can be said that the coating film of the present invention is very smooth.

Dynamic characteristics of the droplet on the coating film can be evaluated by contact angle hysteresis in addition to the sliding angle and the sliding speed. Contact angle hysteresis is the value represented by a difference between the angle (advancing contact angle) formed by the moving side of the droplet and the coating film surface immediately before the droplet starts moving and the angle (receding contact angle) between the rear side of the liquid droplet and coating film surface in the case of increasing inclination of the coating film to which the liquid droplet is adhered. When 6.0 μL of the water droplet is adhered to the coating film of the present invention, the contact angle hysteresis (advancing contact angle–receding contact angle) is preferably 13.5° or less, more preferably 11.0° or less, and still more preferably 8.0° or less. The lower limit of the contact angle hysteresis is not particularly limited and is, for example, 1.0°. When 4.0 μL of the oil droplet (hexadecane) is adhered to the coating film of the present invention, the contact angle hysteresis is preferably 7.0° or less, more preferably 6.0° or less, and still more preferably 5.0° or less. The lower limit thereof is not particularly limited and is, for example, 0.5°.

The coating film of the present invention contains fluorine and is excellent in water repellency and oil repellency. Specifically, it is possible to adjust the static contact angle of water, measured by setting the amount of the water droplet at 3.0 μL using the θ/2 method, to 113° or more, preferably 114° or more, and more preferably 115° or more. The upper limit of the contact angle is not particularly limited and is, for example, 120°. It is possible to adjust the static contact angle of oil, measured by setting the amount of the oil droplet (hexadecane) at 3.0 μL using the θ/2 method, to 65.0° or more, and more preferably 65.5° or more. The upper limit is particularly limited and is, for example, 70°.

As mentioned below, it is preferred to use, as the composition for obtaining the coating film of the present invention, a composition containing a compound (A) in which a group having a perfluoropolyether structure and a hydrolyzable group are bonded to a silicon atom. When using such a compound (A), the resulting coating film has a perfluoropolyether structure. The coating film of the present invention usually has a polysiloxane backbone. Furthermore, when the composition for obtaining the coating film of the present invention contains a fluoroalkylsilane mentioned below, it is possible to obtain a coating film in which a fluoroalkyl group (preferably a fluoroalkyl group having a perfluoroalkyl group such as a trifluoromethyl group at the end) is directly bonded to a silicon atom of the polysiloxane backbone. When using, as the compound (A), a compound (A) in which a group having a perfluoropolyether structure and a hydrolyzable group are bonded to a silicon atom, the perfluoropolyether structure existing on the free end side, it is possible to obtain a coating film in which a group having a perfluoropolyether structure is bonded to the free end side of a silicon atom of the polysiloxane backbone.

The coating film of the present invention preferably has a thickness of 4 nm or more and 100 nm or less. The lower limit of the thickness is more preferably 4.3 nm or more, and still more preferably 4.5 nm or more. The upper limit of the thickness is more preferably 90 nm or less, and still more preferably 80 nm or less. The upper limit of the thickness is more preferably 50 nm or less, and still more preferably 20 nm or less.

It can also be said that the coating film of the present invention is a fluorine-containing film whose outermost surface layer has a density of 1.6 g/cm$^3$ or more. The coating film of the present invention is also characterized in that the outermost surface layer has high density. The density of the outermost surface layer is preferably 1.63 g/cm$^3$ or more, and more preferably 1.65 g/cm$^3$ or more. The upper limit of the density of the outermost surface layer is not particularly limited and is, for example, 1.9 g/cm$^3$. When roughness exists on the outermost surface of the coating film, interface roughness (roughness) can be measured by the measurement results of X-ray reflectance. When the measurement value of the roughness is a very small numerical value, for example, it is 0.5 nm or less, roughness of the outermost surface can be compared not only by the roughness value but also by coarseness and fineness of the outermost surface of the coating film. When something has a bulk density of A, if roughness, i.e. an air layer, exists on the surface, in the measurement of the coarseness and fineness of the outermost surface of the coating film, it is considered that the density of the outermost surface is calculated as an average of the bulk density A and the density B of the air caused by the roughness. Actually, the coating film of the present invention has a higher density of the film surface than that of the coating film of Comparative Example. That is, this means that a coating film, which has small roughness and is uniform in the thickness direction, is obtained.

There has hitherto been employed, as a means for measuring the laminated structure, thickness, or density of a multilayer thin film whose composition or film structure is unknown, an X-ray reflectance method. This X-ray reflectance method is a method in which measurement is made by utilizing interference oscillation of X-ray reflected at an interface where layers having different densities are in contact with each other, and the method is used in, for example, measurement of a thickness of an oxide film formed on an electrode and analysis of a laminated structure of a spin-valve film.

In such X-ray reflectance measurement (XRR), by observing a phenomenon that X-rays reflected at each interface of the coating film interfere with each other as mentioned above and fitting the measurement results using simulation calculation data, it becomes possible to analyze the density, thickness and roughness of each layer. The above-mentioned density of the outermost surface layer means a value obtained by subjecting to a fitting treatment. Here, fitting means correcting a difference between the theoretically calculated value of the spectral intensity and the actually measured intensity with respect to the X-ray spectrum detected during the X-ray measurement.

FIG. 1 shows an example in which the XRR measurement results of the coating film are subjected to fitting processing. The density of a thin film having a thickness of several tens nm from the outermost surface can be calculated from the total reflection critical angle and the density of the other layers can be calculated from the magnitude of the interference fringe amplitude.

The thickness of each layer can be calculated from the cycle of vibration. Roughness can be calculated from the attenuation rate of the entire reflectance measurement data and the attenuation of the amplitude of interference fringes on the high angle side, as mentioned in, for example, JP 2001-349849 A.

The procedure of the fitting processing will be specifically described below. First, measurement data are obtained by X-ray incidence from an angle near the critical angle to the surface of a coating film sample composed of a single layer film or a multilayer film. When the number of measurement points of data is Np and the angle of incident X-ray at a certain measurement point n is α (n), for example, each reflected X-ray intensity at α (n) of 0.05° to 5° is observed, and then normalized with the intensity of the incident X-ray to obtain a reflectance R {α (n)} of X-ray at the incident angle α (n). The correlation diagram of α (n) to R {α (n)} is called the XRR profile. Depending on the substrate and the thickness of the sample, there is a need to measure under appropriate conditions, and the appropriate conditions are specifically the measurement range of an angle α (n) of incident X-ray and a divergence angle [°] of incident X-ray.

In α (n), an angle at the start of measurement must satisfy the condition that the incident X-ray is totally reflected. Generally, it is possible to estimate the conditions, under which the X-ray are totally reflected, from elemental species and density, and the total reflection critical angle is said to be 0.23° for glass substrate, Si substrate and the like. Further, the measurement end angle is preferably an angle at which the signal intensity becomes substantially the same as the background intensity.

Regarding the divergence angle of incident X-ray, it is known that the period of interference of X-ray [°] becomes shorter as the thickness of the coating film on the substrate becomes thicker and, as the thickness increases, the divergence angle [°] of incident X-ray must be lowered. Generally, it is said that when the thickness of the coating film is 100 nm or more, the divergence angle must be 0.015° or less and, when the thickness is 300 nm or more, the divergence angle must be 0.003° or less. To reduce the divergence angle to 0.015° or less, it is possible to employ a method of reflecting once using a spectroscopic crystal such as Ge (110). Further, in order to make the divergence angle 0.003° or less, there is a method of reflecting twice with a spectroscopic crystal such as Ge (110). In these spectroscopic crystals, the incident intensity drastically decreases when reflecting X-ray. Therefore, it is better not to introduce the spectroscopic crystal more than necessary.

In contrast to the actually measured profile obtained by measuring in this way, profile, which is obtained by simulation calculation by changing at least one or more of parameters of the thickness, density and roughness (interface between the air and the coating film, interface between the coating films in the multilayer film, interface between the coating film and the substrate) after initializing the parameters to each of the substrate, coating film and multilayer film, is referred to as a simulation calculation profile. The structure of the coating film sample is determined by fitting such that the simulation calculation profile is close to the actually measured profile.

As the procedure of fitting processing, for example, an analysis by the least-squares method is used. A parameter that minimizes the residual square sum between the simulation calculation profile and the actual measurement profile is determined. This is a set of parameters that best fit the measurement data.

The residual square sum ($\chi^2$) is the difference between the calculated reflectance (Ical) of the spectral intensity and the experimental reflectance (Iexp), which is expressed by the formula (Y) and is desirably 0.01 or less. Here, Np is the number of data points within the fitting range. αi is the angle of the incident X-ray.

[Equation 1]

$$\chi^2 = \sum_{i=0}^{N_p} [\log\{I_{exp}(\alpha_i)\} - \log\{I_{cal}(\alpha_i)\}]^2 \quad (Y)$$

The above fitting processing can be analyzed by using analysis software (GlobalFit) manufactured by Rigaku Corporation.

As described above, according to the X-ray reflectance measurement (XRR) function, it is possible to measure the film type section, thickness, coating film density and roughness state of the coating film thus formed.

The coating film of the present invention can be obtained by spray-coating a substrate with a composition mentioned in detail below and subjecting the coated substrate to a predetermined pretreatment. Hereinafter, preferred compositions, spray coating conditions, and pretreatment conditions for obtaining the coating film of the present invention will be described in order.

It is important to use, as the composition for obtaining the coating film of the present invention, a composition at least one of a fluoroalkylsilane (B1) and a hydrolyzable silane oligomer (B2) is dissolved in a fluorine-based solvent (C) together with a predetermined compound (A), or a composition in which (i) at least one of a fluoroalkylsilane (B1) and a hydrolyzable silane oligomer (B2) and (ii) a fluorine-based solvent (D) is dissolved in a fluorine-based solvent (C) (different from the fluorine-based solvent (D)) together with a predetermined compound (A). It is possible to exhibit water and oil repellency by a perfluoropolyether structure possessed by the compound (A), and it is possible to reduce surface roughness of the coating film by using one or more of the above-mentioned (B1) and (B2) and using a fluorine-based solvent (D) as necessary, thus enabling enhancement in abrasion resistance and sliding properties.

The compound (A) may be any compound which contains fluorine and can serve as a matrix of a coating film by bonding through a polymerization reaction (particularly polycondensation reaction) together with fluorine-containing monomers or other monomers. The compound (A) is preferably a compound having a fluorine-containing group and a hydrolyzable group, and more preferably a compound in which a group having a perfluoropolyether structure and a hydrolyzable group are bonded to a silicon atom.

The perfluoropolyether structure is a structure in which all hydrogen atoms of a polyalkylene ether group or a polyalkylene glycol dialkyl ether residue are substituted with fluorine atoms, and it can also be called a perfluoropolyalkylene ether group or a perfluoropolyalkylene glycol dialkyl ether residue. The perfluoropolyether structure also has water repellency and oil repellency. The number of carbon atoms contained in the longest linear moiety of the perfluoropolyether structure is preferably, for example, 5 or more, more preferably 10 or more, and still more preferably 20 or more. The upper limit of the number of carbon atoms is not particularly limited and may be about 200.

It is preferable that the compound (A) has the perfluoropolyether structure on the free end side. A suitable linking group may exist on the side where the perfluoropolyether structure is bonded to the silicon atom and the perfluoropolyether structure may be directly bonded to the silicon atom without the linking group. Examples of the linking group include hydrocarbon groups such as an alkylene group or an aromatic hydrocarbon group, a (poly)alkylene glycol group, a group in which a part of hydrogen atoms of these groups are substituted with F, a group in which these groups are appropriately linked and the like. The number of carbon atoms of the linking group is, for example, 1 or more and 20 or less, and preferably 2 or more and 10 or less.

Plural silicon atoms may be bonded to one linking group, and plural perfluoroalkyl groups or perfluoropolyether groups may be bonded to one linking group. The number of fluorine-containing groups bonded to the silicon atom may be 1 or more or may be 2 or 3, and is preferably 1 or 2, and particularly preferably 1.

The hydrolyzable group has an action of bonding the compounds (A) with each other or bonding the compound (A) with active hydrogen (hydroxyl group, etc.) on a surface of the substrate through a hydrolysis reaction and a dehydration condensation reaction. Examples of such hydrolyzable group include an alkoxy group (particularly an alkoxy group having 1 to 4 carbon atoms), a hydroxy group, an acetoxy group, a halogen atom (particularly a chlorine atom) and the like. The hydrolyzable group is preferably an alkoxy group and a halogen atom, and particularly preferably a methoxy group, an ethoxy group, and a chlorine atom.

The number of hydrolyzable groups bonded to the silicon atom may be 1 or more or may be 2 or 3, and is preferably 2 or 3, and particularly preferably 3. When two or more hydrolyzable groups are bonded to a silicon atom, different hydrolyzable groups may be bonded to the silicon atom, and the same hydrolyzable group is preferably bonded to the silicon atom. The total number of the fluorine-containing group and the hydrolyzable group bonded to the silicon atom is usually 4 and may be 2 or 3 (particularly 3). When it is 3 or less, for example, an alkyl group (particularly an alkyl group having 1 to 4 carbon atoms), H, NCO and the like can be bonded to the remaining bonds.

The group having a perfluoropolyether structure of the compound (A) may be linear or may have a side chain.

The compound (A) includes, for example, a compound of the following formula (1).

[Chemical Formula 4]

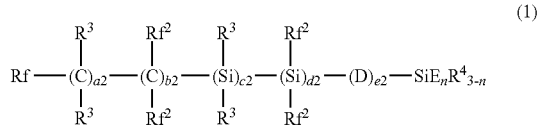

(1)

Each symbol in the formula (1) has the following meaning. Rf represents a fluorine atom or an alkyl group having 1 to 20 carbon atoms substituted with one or more fluorine atoms. Rf is preferably an alkyl group having 1 to 10 carbon atoms substituted with one or more fluorine atoms, more preferably a perfluoroalkyl group having 1 to 10 carbon atoms, and still more preferably a perfluoroalkyl group having 1 to 5 carbon atoms.

$Rf^2$ each independently represents a fluorine atom or an alkyl group having 1 to 20 carbon atoms substituted with one or more fluorine atoms. Preferably, $Rf^2$ each independently is a fluorine atom or a fluorine-containing alkyl group having 1 to 2 carbon atoms and, more preferably, all are fluorine atoms.

$R^3$ each independently represents a hydrogen atom or a lower alkyl group. Preferably, $R^3$ each independently is a hydrogen atom or an alkyl group having 1 or 2 carbon atoms and, more preferably, all are hydrogen atoms.

$R^4$ each independently represents an alkyl group having 1 to 20 carbon atoms when plural $R^4$ (s) exist. $R^4$ is preferably an alkyl group having 1 to 5 carbon atoms.

D each independently represents —O—, —COO—, —OCO—, —NR—, —NRCO— or —CONR— (R is a hydrogen atom or a lower alkyl group or a lower fluorine-containing alkyl group) when plural D(s) exist. Preferably, D each independently is —COO—, —O—, or —OCO— and, more preferably, all are —O—, when plural D(s) exist.

E each independently represents a hydrolyzable group when plural E(s) exist. Preferably, E each independently is an alkoxy group having 1 to 4 carbon atoms or a halogen atom and, more preferably, E is any one selected from the group consisting of a methoxy group, an ethoxy group, and a chlorine atom, when plural E(s) exist.

a2, b2, c2, d2 and e2 each independently represents an integer of 0 or more 600 or less, and the total value of a2, b2, c2, d2 and e2 is preferably 13 or more. More preferably, a2, c2 and d2 each independently is ½ or less of b2, and still more preferably ¼ or less. Yet more preferably, c2 or d2 is 0 and, particularly preferably, c2 and d2 are 0.

e2 is preferably ⅕ or more of the total value of a2, b2, c2 and d2 and is the total value of a2, b2, c2 and d2 or less.

b2 is preferably 20 or more and 600 or less, more preferably 20 or more and 200 or less, and still more preferably 50 or more and 200 or less.

e2 is preferably 4 or more and 600 or less, more preferably 4 or more and 200 or less, and still more preferably 10 or more and 200 or less.

The total value of a2, b2, c2, d2 and e2 is preferably 20 or more and 600 or less, more preferably 20 or more and 200 or less, and still more preferably 50 or more and 200 or less.

The order of each repeating unit enclosed in parentheses attached with a2, b2, c2, d2 and e2 is arbitrary in the formula and, preferably, the repeating unit enclosed in parentheses attached with b2 located nearest to the fixed end side (the side where a fluorine-containing group is boned to a silicon atom) is located on the free end side as compared to the repeating unit enclosed in parentheses attached with a2 located nearest to the free end side. More preferably, the repeating unit enclosed in parentheses attached with b2 or d2 located nearest to the fixed end side is located on the free end side as compared to the repeating unit enclosed in parentheses attached with a2 or c2 located nearest to the free end side.

n is an integer of 1 or more and 3 or less. n is preferably 2 or more and 3 or less, and more preferably 3.

"Lower" of the above formula (1) means that the number of carbon atoms is 1 to 4.

In formula (1), it is particularly preferred that Rf is a perfluoroalkyl group having 1 to 5 carbon atoms, all $Rf^2$ (s) are fluorine atoms, all D(s) are —O—, E is a methoxy group, an ethoxy group, or a chlorine atom (particularly a methoxy group or an ethoxy group), each of a2, c2 and d2 is 0, n is 3 and e2 is 4 or more and 600 or less.

The compound (A) includes, for example, a compound represented by the following formula (2) and a compound represented by formula (2') and is preferably a compound represented by formula (2).

[Chemical Formula 5]

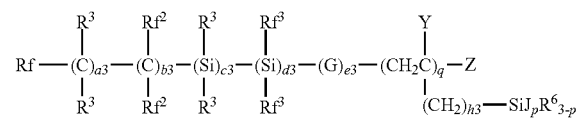

(2)

Each symbol in the formula (2) has the following meaning.

Rf represents a fluorine atom or an alkyl group having 1 to 20 carbon atoms substituted with one or more fluorine atoms, Rf is preferably an alkyl group having 1 to 10 carbon atoms substituted with one or more fluorine atoms, more preferably a perfluoroalkyl group having 1 to 10 carbon atoms, and still more preferably a perfluoroalkyl group having 1 to 5 carbon atoms.

$Rf^3$ each independently represents a fluorine atom or an alkyl group having 1 to 20 carbon atoms substituted with one or more fluorine atoms. Preferably, $Rf^3$ each independently is a fluorine atom or a fluorine-containing alkyl group having 1 to 2 carbon atoms and, more preferably, all are fluorine atoms.

$R^5$ each independently represents a hydrogen atom or a lower alkyl group. Preferably, $R^5$ each independently is a hydrogen atom or an alkyl group having 1 or 2 carbon atoms and, more preferably, all are hydrogen atoms.

$R^6$ each independently represents an alkyl group having 1 to 20 carbon atoms. $R^6$ is preferably an alkyl group having 1 to 5 carbon atoms.

G each independently represents —O—, —COO—, —OCO—, —NR—, —NRCO—, or —CONR— (R is a hydrogen atom or a lower alkyl group or a lower fluorine-containing alkyl group) when plural G(s) exist. Preferably, G each independently represents —COO—, —O—, or —OCO— and, more preferably, all are —O—, when plural G(s) exist.

J each independently represents a hydrolyzable group when plural J(s) exist. J is preferably any one selected from the group consisting of an alkoxy group and a halogen atom, and particularly preferably any one elected from the group consisting of a methoxy group, an ethoxy group, and a chlorine atom.

Y each independently represents a hydrogen atom or a lower alkyl group when plural Y(s) exist. Preferably, Y each independently is a hydrogen atom or an alkyl group having 1 or 2 carbon atoms and, more preferably, all are hydrogen atoms, when plural Y(s) exist.

Z represents a hydrogen atom or a halogen atom. Z is preferably a hydrogen atom.

a3, b3, c3, d3 and e3 each independently represents an integer of 0 or more and 600 or less, and the total value of a3, b3, c3, d3 and e3 is 13 or more. More preferably, a3, c3 and d3 each independently is ½ or less of b3, and still more preferably ¼ or less. Yet more preferably, c3 or d3 is 0 and, particularly preferably, c3 and d3 are 0.

E3 is preferably ⅕ or more of the total value of a3, b3, c3 and d3 and is the total value of a3, b3, c3 and d3 or less.

b3 is preferably 20 or more and 600 or less, more preferably 20 or more and 200 or less, and still more preferably 50 or more and 200 or less. e3 is preferably 4 or more and 600 or less, more preferably 4 or more and 200 or less, and still more preferably 10 or more and 200 or less. The total value of a3, b3, c3, d3, and e3 is preferably 20 or more and 600 or less, more preferably 20 or more and 200 or less, and still more preferably 50 or more and 200 or less.

h3 is an integer of 0 or more and 2 or less, and preferably 0 or more and 1 or less.

q is an integer of 1 or more and 20 or less, and preferably 1 or more and 18 or less. q is still more preferably 2 or more and 15 or less.

The order of each repeating unit enclosed in parentheses attached with a3, b3, c3, d3 and e3 is arbitrary in the formula and, preferably, the repeating unit enclosed in parentheses attached with b3 located nearest to the fixed end side (the side where a fluorine-containing group is boned to a silicon atom) is located on the free end side as compared to the repeating unit enclosed in parentheses attached with a3 located nearest to the free end side. More preferably, the repeating unit enclosed in parentheses attached with b3 or d3 located nearest to the fixed end side is located on the free end side as compared to the repeating unit enclosed in parentheses attached with a3 or c3 located nearest to the free end side.

P is an integer of 1 or more and 3 or less, preferably 2 or more and 3 or less, and more preferably 3.

"Lower" in formula (2) means that the number of carbon atoms is 1 to 4.

[Chemical Formula 6]

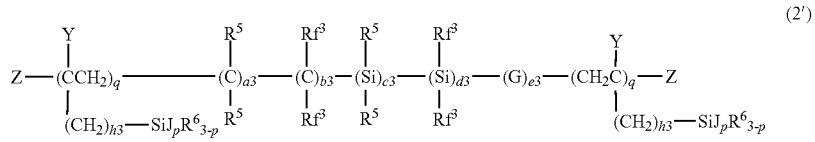

(2')

In the formula (2'), a3 to e3, h3, p, q, $Rf^3$, $R^5$, $R^6$, J, Y and Z are as defined in the formula (2).

In formulas (2) and (2'), it is particularly preferred that Rf is a perfluoroalkyl group having 1 to 5 carbon atoms, all $Rf^3$ (s) are fluorine atoms, all G(s) are —O—, J is a methoxy group, an ethoxy group, or a chlorine atom (particularly a methoxy group or an ethoxy group), Y and Z are hydrogen atoms, a3 is 0, c3 and d3 are 0, h3 is 0 or more and 1 or less (particularly 0), and p is 3.

As mentioned above, in the present invention, by using at least one of a fluoroalkylsilane (B1) and a hydrolyzable silane oligomer (B2) and using a fluorine-based solvent (D) as necessary, together with the compound (A), the thus obtained coating film is smoothened and the abrasion resistance is improved, and sliding properties are also improved. The compounds (B1), (B2), and (D) may be high-boiling point compounds which exhibit a predetermined vapor pressure. Namely, the compounds (B1), (B2) and (D) are preferably high-boiling point compounds having a vapor pressure of 1 atmosphere or less at a temperature of 100° C. The high-boiling point compound may not have a boiling point. However, when the high-boiling point compound has a boiling point, a compound having a boiling point of 100° C. or higher corresponds to the compound. In the preferred compound, the temperature at which the vapor pressure is 1 atmosphere or more is 110° C. or higher, more preferably 120° C. or higher, and still more preferably 130° C. or higher. The upper limit of the temperature at which the vapor pressure is 1 atmosphere or more is not particularly limited and the compound may be a compound which starts decomposition before the vapor pressure reaches 1 atmosphere or more.

The above compounds (B1) and (B2) may contain one or more of these compounds. It is possible to exemplify, as use of the compounds (B1), (B2) and (D), the embodiments in which one or more compounds (B1) and (B2) are used and the embodiment in which the fluorine-based solvent (D) and one or more compounds (B1) and (B2) are used in combination. The embodiment in which the fluorine-based solvent (D) and one or more compounds (B1) and (B2) are used in combination is preferable since wear resistance and sliding property are further enhanced in the embodiment. When the fluorine-based solvent (D) and one or more compounds (B1) and (B2) are used in combination, it is particularly preferred to use the fluorinated solvent (D) and the fluoroalkylsilane (B1).

The fluoroalkylsilane (B1) is preferably a compound in which a hydrolyzable group is bonded to a silicon atom of the fluoroalkylsilane. The fluoroalkyl group of the fluoroalkylsilane is preferably a group having a fluoroalkyl group at the end, and particularly preferably a group in which a perfluoroalkyl group such as a trifluoromethyl group exists at the end.

Examples of the fluoroalkyl group include fluoroalkyl groups having 1 to 12 carbon atoms, such as a fluoromethyl group, a fluoroethyl group, a fluoropropyl group, a fluorobutyl group, a fluoropentyl group, a fluorohexyl group, a fluoroheptyl group, a fluorooctyl group, a fluorononyl group, a fluorodecyl group, a fluoroundecyl group, and a fluorododecyl group.

When the hydrolyzable group is bonded to the silicon atom of the fluoroalkylsilane (B1), and examples of the hydrolyzable group include hydrolyzable groups which are the same as those shown as examples in the compound (A). The hydrolyzable group is preferably an alkoxy group and a halogen atom, and particularly preferably a methoxy group, an ethoxy group, and a chlorine atom. The hydrolyzable group may be the same or different when plural hydrolyzable groups exist, and hydrolyzable groups are preferably the same.

The total number of fluoroalkyl groups and hydrolyzable groups bonded to a silicon atom is usually 4 and may be 2 or 3 (particularly 3). When the total number is 3 or less, for example, an alkyl group (particularly an alkyl group having 1 to 4 carbon atoms), H, a cyano group and the like can be bonded to the remaining bonds. It is particularly preferred that the total number of fluoroalkyl groups and hydrolyzable groups is 4. In this case, the number of fluoroalkyl groups and the number of hydrolyzable groups preferably correspond to any one of the following cases: the number of fluoroalkyl groups is 3 and the number of hydrolyzable groups is 1, the number of fluoroalkyl groups and the number hydrolyzable groups are simultaneously 2, and the number of fluoroalkyl groups is 1 and the number of hydrolyzable groups is 3, and it is preferred that the number of fluoroalkyl groups is 1 and the number of hydrolyzable groups is 3.

The combination of the fluoroalkyl group and the hydrolyzable group is not particularly limited and may be any one of those including or not including the below-mentioned formula (6). The combination is preferably a combination of a fluoroalkyl group and an alkoxy group (such as fluoroalkylalkoxysilane, particularly fluoroalkyltrialkoxysilane, etc.), a combination of a fluoroalkyl group and a halogen atom (fluoroalkylhalosilane, etc., particular fluoroalkyltrihalosilane).

From the viewpoint of ease of synthesis, the fluoroalkylsilane (B1) is more preferably a compound represented by the following formula (3).

[Chemical Formula 7]

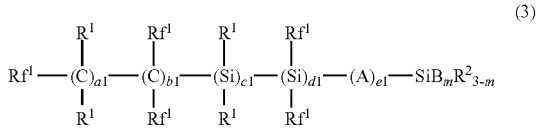

Each symbol in the formula (3) has the following meaning.

$Rf^1$ each independently represents a fluorine atom or an alkyl group having 1 to 20 carbon atoms substituted with one or more fluorine atoms.

$R^1$ each independently represents a hydrogen atom or a lower alkyl group.

$R^2$ each independently represents an alkyl group having 1 to 20 carbon atoms when plural $R^2$ (s) exist, A represents —O—, —COO—, —OCO—, —NR—, —NRCO—, or —CONR— when plural A(s) exist, and R represents a hydrogen atom, a lower alkyl group, or a lower fluorine-containing alkyl group, B each independently represents a hydrolyzable group when plural B(s) exist, a1, b1, c1, d1 and e1 each independently represents an integer of 0 or more and 100 or less. The order of each repeating unit enclosed in parentheses attached with a1, b1, c1, d1 and e1 is arbitrary in the formula. The total value of a1, b1, c1, d1 and e1 can be 100 or less.

m is an integer of 1 or more and 3 or less.

In the formula (3), "lower" means that the number of carbon atoms is 1 to 4.

$Rf^1$ is preferably a fluorine atom or a perfluoroalkyl having 1 to 10 carbon atoms (more preferably 1 to 5 carbon atoms). $R^1$ is preferably a hydrogen atom or an alkyl having 1 to 4 carbon atoms. $R^2$ is preferably an alkyl group having 1 to 5 carbon atoms. Preferably, A each independently is any one selected from the group consisting of —O—, —COO—, and —OCO— when plural A(s) exist. Preferably, B each independently is an alkoxy group having 1 to 4 carbon atoms or a halogen atom and is more preferably any one selected from the group consisting of a methoxy group, an ethoxy group, and a chlorine atom, when plural B(s) exist. a1 is preferably 1 to 30, more preferably 1 to 25, still more preferably 1 to 10, particularly preferably 1 to 5, and most preferably 1 to 2. b1 is preferably 0 to 15, and more preferably 0 to 10. c1 is preferably 0 to 5, and more preferably 0 to 2. d1 is preferably 0 to 4, and more preferably 0 to 2. e1 is preferably 0 to 4, and more preferably 0 to 2. m is preferably 2 to 3, and more preferably 3. The total value of a1, b1, c1, d1, and e1 is preferably 3 or more, and more preferably 5 or more, and the total value thereof is preferably 80 or less, more preferably 50 or less, and still more preferably 20 or less.

It is particularly preferred that $Rf^1$ is a fluorine atom or a perfluoroalkyl having 1 to 5 carbon atoms, $R^1$ is a hydrogen atom, B is a methoxy group or an ethoxy group, each of c1, d1 and e1 is 0, m is 3, a1 is 1 to 5, and b1 is 0 to 5.

Examples of the fluoroalkylsilane (B1) include $CF_3$—Si—$(OCH_3)_3$ and $C_jF_{2j+1}$—Si—$(OC_2H_5)_3$ (j is an integer of 1 to 12). Among them, $C_4F_9$—Si—$(OC_2H_5)_3$, $C_6F_{13}$—Si—$(OC_2H_5)_3$, $C_7F_{15}$—Si—$(OC_2H_5)_3$, and $C_8F_{17}$—Si—$(OC_2H_5)_3$ are preferable. Examples of the fluoroalkylsilane include $CF_3$ $(CH_2)_2Si(CH_3)_2$ $(CH_2)_kSiCl_3$, $CF_3$ $(CH_2)_2Si(CH_3)_2$ $(CH_2)_kSi(OCH_3)_3$, $CF_3$ $(CH_2)_2Si(CH_3)_2(CH_2)_kSi(OC_2H_5)_3$, $CF_3$ $(CH_2)_6Si(CH_3)_2(CH_2)_kSiCl_3$, $CF_3$ $(CH_2)_6Si(CH_3)_2(CH_2)_kSi(OCH_3)_3$, and $CF_3$ $(CH_2)_6Si(CH_3)_2(CH_2)_kSi$ (OC$_2$H$_5$)$_3$ (each of k is 5 to 20, and preferably 8 to 15). Examples of the fluoroalkylsilane include CF$_3$ (CF$_2$)$_m$—(CH$_2$)$_n$SiCl$_3$, CF$_3$ (CF$_2$)$_m$—(CH$_2$)$_n$Si(OCH$_3$)$_3$, and CF$_3$ (CF$_2$)$_m$—(CH$_2$)$_n$Si(OC$_2$H$_5$)$_3$ (each of m is 1 to 10, and preferably 3 to 7, and each of n is 1 to 5, and preferably 2 to 4). It is also possible to exemplify CF$_3$ (CF$_2$)$_p$—(CH$_2$)$_q$—Si—(CH$_2$CH=CH$_2$)$_3$ (each of p is 2 to 10, and preferably 2 to 8, and each q is 1 to 5, and preferably 2 to 4).

It is also possible to exemplify CF$_3$ (CF$_2$)$_p$—(CH$_2$)$_q$SiCH$_3$Cl$_2$, CF$_3$ (CF$_2$)$_p$—(CH$_2$)$_q$SiCH$_3$ (OCH$_3$)$_2$, and CF$_3$ (CF$_2$)$_p$—(CH$_2$)$_q$SiCH$_3$ (OC$_2$H$_5$)$_2$ (each of p is 2 to 10, and preferably 3 to 7, and each of q is 1 to 5, and preferably 2 to 4).

The hydrolyzable silane oligomer (B2) refers to an oligomer formed by hydrolytic condensation of a silane compound having two or more hydrolyzable groups, and preferably a silane compound having two or more (particularly three) hydrolyzable groups and a fluorine-containing group (particularly a lower fluorine-containing alkyl group). The number (number of condensation) of silicon atoms contained in the oligomer is, for example, 3 or more, preferably 5 or more, and more preferably 7 or more. The condensation number is preferably 15 or less, more preferably 13 or less, and still more preferably 10 or less.

Examples of the hydrolyzable group possessed by the oligomer include alkoxy groups such as a methoxy group, an ethoxy group, a propoxy group, and a butoxy group, and a methoxy group and an ethoxy group are preferable. The oligomer can have one or more of these hydrolyzable groups, and preferably has one hydrolyzable group.

Examples of the hydrolyzable silane oligomer (B2) include a compound represented by the following formula (4).

[Chemical Formula 8]

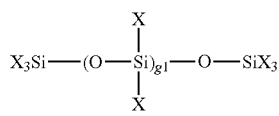

(4)

In the formula (4), X each independently represents a hydrolyzable group, a lower alkyl group, or a lower fluorine-containing alkyl group, and g1 is an integer of 0 or more and 100 or less.

In formula (4), "lower" means that the number of carbon atoms is 1 to 4.

Examples of the hydrolyzable group include alkoxy groups such as a methoxy group, an ethoxy group, a propoxy group, and a butoxy group. At least one of X is a hydrolyzable group (particularly an ethoxy group, a methoxy group), and g1 is preferably 0 or more and 10 or less, and more preferably 0 or more and 7 or less. At least one of X is also preferably a lower fluorine-containing alkyl group.

Examples of the hydrolyzable silane oligomer include (H$_5$C$_2$O)$_3$—Si—(OSi(OC$_2$H$_5$)$_2$)$_4$OC$_2$H$_5$, (H$_3$CO)$_2$Si (CH$_2$CH$_2$CF$_3$)—(OSiOCH$_3$(CH$_2$CH$_2$CF$_3$))$_4$—OCH$_3$ and the like.

The second fluorinated solvent (D) preferably has 10 or more carbon atoms. The second fluorine-based solvent (D) is preferably a polyether including a perfluorooxyalkylene unit and having no silicon atom; a polymer including a structural unit derived from a perfluoroalkylene monomer in which one or more fluorine atoms are optionally substituted with alkoxy groups; or a polyether including a perfluorooxyalkylene unit and an oxyalkylene unit and having no silicon atom. More specifically, examples of the polyether including a perfluorooxyalkylene unit and having no silicon atom include compounds represented by the following formula (5). It is possible to use compounds represented by the following formula (6) as the polymer including a structural unit derived from a perfluoroalkylene monomer in which one or more fluorine atoms are optionally substituted with alkoxy groups. Examples of the polyether including a perfluorooxyalkylene unit and an oxyalkylene unit and having no silicon atom include compounds represented by the following formula (7).

$$X—(OC_4F_8)_a—(OC_3F_6)_b—(OC_2F_4)_c—(OCF_2)_d—Y \quad (5)$$

In the formula (3), each of a, b, c and d is a symbol which represents a repeating unit, and the range can be appropriately set in a range where a liquid can be maintained under normal pressure. Each of repeating units enclosed by a, b, c and d may be repeated at random from each other. X is an alkyl group having 1 to 16 carbon atoms in which one or more hydrogen atoms are optionally substituted with fluorine atoms, and Y is an alkoxy group having 1 to 16 carbon atoms in which one or more hydrogen atoms are optionally substituted with fluorine atoms or an OH group.

In formula (3), —(OC$_4$F$_8$)— is any one of —(OCF$_2$CF$_2$CF$_2$CF$_2$)—, —(OCF(CF$_3$)CF$_2$CF$_2$)—, —(OCF$_2$CF(CF$_3$)CF$_2$)—, —(OCF$_2$CF$_2$CF(CF$_3$))—, —(OC(CF$_3$)$_2$CF$_2$)—, —(OCF$_2$C(CF$_3$)$_2$)—, and (OCF(CF$_3$)CF(CF$_3$))— and is preferably —(OCF$_2$CF$_2$CF$_2$CF$_2$)—. —(OC$_3$F$_6$)— may be any one of —(OCF$_2$CF$_2$CF$_2$)—, —(OCF(CF$_3$)CF$_2$)—, and (OCF$_2$CF(CF$_3$))— and is preferably —(OCF$_2$CF$_2$CF$_2$)—. —(OC$_2$F$_4$)— may be either —(OCF$_2$CF$_2$)— or (OCF(CF$_3$))—.

X is preferably an alkyl group having 1 to 3 carbon atoms (particularly a trifluoromethyl group) in which one or more hydrogen atoms are optionally substituted with fluorine atoms, and Y is preferably an alkoxy group having 1 to 3 carbon atoms (particularly a trifluoromethoxy group) in which one or more hydrogen atoms are optionally substituted with fluorine atoms or an OH group.

[Chemical Formula 9]

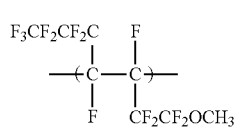

(6)

[Chemical Formula 10]

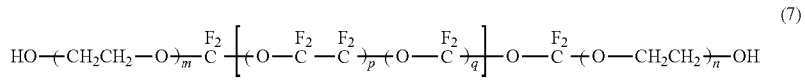

(7)

In the above formula (7), each of p, q, m and n is a symbol which represents a repeating unit, and the range can be appropriately set within a range where a liquid can be maintained under normal pressure. The repeating unit enclosed by p and the repeating unit enclosed by q may be repeated at random from each other.

It is possible to use, as the fluorine-based solvent (D), for example, perfluoropolyethers HT-200, HT-230, and TH-270 manufactured by Solvay.

Each concentration of the compounds (A), (B1), (B2) and (D) is, for example, 0.01 to 10% by mass, preferably 0.01 to 10% by mass, more preferably 0.02 to 3% mass, and still more preferably 0.05 to 1% by mass. The concentration of the compound (A) is preferably 0.05 to 0.5% by mass, more preferably 0.05 to 0.3% by mass, and still more preferably 0.06 to 0.15% by mass. When two or more compounds are included as the compounds (B1), (B2) and (D), the total concentration of these compounds is preferably set within the above range.

It is preferred to use the compound (A) and the above compounds (B1), (B2) and (D) at an appropriate mass ratio, and the mass ratio of the above compounds (B1), (B2) and (D) (total amount) to the compound (A) is preferably in a range of 0.3 to 20. The mass ratio is more preferably 0.5 to 15, and still more preferably 1 to 10. When the mass ratio is adjusted to the above ratio, a coating film having high transparency and satisfactory appearance can be obtained.

The water- and oil-repellent coating composition of the present invention is obtained by dissolving one or more of the compounds (B1) and (B2) and a fluorine-based solvent (D) as necessary in a fluorine-based solvent (C) (main solvent) together with the compound (A). The fluorine-based solvent (C) as the main solvent is a solvent which is different from the fluorine-based solvent (D). Specific examples of the fluorinated solvent (C) as the main solvent include flon-based solvents, for example, hydrofluoroether such as Novec (manufactured by 3M Company), perfluorocarbon such as Fluorinert (manufactured by 3M Company), hydrochlorofluorocarbon such as Asahiklin AK 225 (manufactured by Asahi Glass Company, Limited), hydrofluorocarbon such as Asahiklin AC 2000 (manufactured by Asahi Glass Company, Limited) and the like. When a chlorine-containing fluorocarbon-based organic solvent is used, an organic chlorine-based solvent such as chloroform may be further added.

The water- and oil-repellent coating composition of the present invention may further contain a silanol condensation catalyst. Examples of the silanol condensation catalyst include inorganic acids such as hydrochloric acid and nitric acid, organic acids such as acetic acid, metal complexes such as titanium complexes (e.g., ORGATIX TC100, manufactured by Matsumoto Fine Chemical Co., Ltd.) and tin complexes. The amount of the silanol condensation catalyst is, for example, 0.001 to 0.05% by mass based on the total amount of a compound (A), a fluoroalkylsilane (B1), a hydrolyzable silane oligomer (B2), a fluorine-based solvent (D), and a fluorine type solvent (C).

As long as the effects of the present invention are not impaired, the water- and oil-repellent coating composition of the present invention may contain various additives such as antioxidants, rust inhibitors, ultraviolet absorbers, photostabilizers, antifungal agents, antibacterial agents, organism adhesion preventing agents, deodorizers, pigments, flame retardants, and antistatic agents.

Examples of the antioxidant include the following phenol-based antioxidants, sulfur-based antioxidants, phosphorus-based antioxidants, hindered amine-based antioxidants and the like.

Examples thereof include phenol-based antioxidants such as n-octadecyl-3-(4-hydroxy-3,5-di-t-butylphenyl)propionate, 2,6-di-t-butyl-4-methylphenol, 2,2-thio-diethylene-bis-[3-(3,5-di-t-butyl-4-hydroxyphenyl)propionate], tri-ethylene glycol-bis-[3-(3-t-butyl-5-methyl-4-hydroxyphenyl) propionate], 3,9-bis[2-{3-(3-t-butyl-4-hydroxy-5-methylphenyl)propionyloxy}-1,1-dimethylethyl]-2,4,8,10-tetraoxaspiro[5·5]undecane, tetrakis{3-(3,5-di-t-butyl-4-hydroxyphenyl)-propionic acid}pentaerythrityl esters, 2-t-butyl-6-(3-t-butyl-2-hydroxy-5-methylbenzyl)-4-methylphenyl acrylate, 2-[1-(2-hydroxy-3,5-di-t-pentylphenyl)ethyl]-4,6-di-t-pentylphenyl acrylate, 1,3,5-trimethyl-2,4,6-tris(3,5-di-t-butyl-4-hydroxybenzyl) benzene, tris(3,5-di-t-butyl-4-hydroxybenzyl)isocyanurate, 1,3,5-tris(4-t-butyl-3-hydroxy-2,6-dimethylbenzyl)-1,3,5-triazine-2,4,6-(1H,3H,5H)-trione, 2,2'-methylenebis(6-t-butyl-4-methylphenol), 4,4'-butylidenebis (6-t-butyl-3-methylphenol), and 4,4'-thiobis(6-t-butyl-3-methylphenol).

Examples thereof include sulfur-based antioxidants such as 3,3'-thiodipropionic acid di-n-dodecyl esters, 3,3'-thiodipropionic acid di-n-tetradecyl esters, 3,3'-thiodipropionic acid di-n-octadecyl esters, and tetrakis(3-dodecylthiopropionic acid)pentaerythrityl esters.

Examples thereof include phosphorus-based antioxidants such as tris(2,4-di-t-butylphenyl)phosphite, bis(2,4-di-t-butylphenyl)pentaerythritol diphosphite, bis(2,6-di-t-butyl-4-methylphenyl)pentaerythritol diphosphite, bis(2,4-di-cumylphenyl)pentaerythritol diphosphite, tetrakis(2,4-di-t-butylphenyl)-4,4'-biphenylene diphosphonite, and bis-[2,4-di-t-butyl, (6-methyl)phenyl]ethyl phosphite.

Examples thereof include hindered amine-based antioxidants such as sebacic acid bis(2,2,6,6-tetramethyl-4-piperidyl) ester (melting point: 81 to 86° C.), 2,2,6,6-tetramethyl-4-piperidyl methacrylate (melting point: 58° C.), and poly[{6-(1,1,3,3-tetramethylbutyl)amino-1,3,5-triazine-2,4-diyl}{(2,2,6,6-tetramethyl-4-piperidyl)imino}-1,6-hexamethylene{(2,2,6,6-tetramethyl-4-piperidyl)imino}].

Examples of the rust inhibitor include rust inhibitors such as alkanolamine, quaternary ammonium salts, alkanethiol, imidazoline, sodium metavanadate, bismuth citrate, phenol derivatives, polyalkenylamine, alkylimidazoline derivatives, cyanoalkylamine, carboxylic acid amide, alkylenediamine, pyrimidine and carboxylic acid thereof, naphthenic acid, sulfonic acid complexes, calcium nitrite, alkylamine and esters, polyalcohol, polyphenol, alkanolamine, sodium molybdate, sodium tungstate, sodium nitrite, sodium phosphonate, sodium chromate, sodium silicate, gelatin, polymers of carboxylic acid, aliphatic and aromatic amines and diamine, ethoxylated amine, imidazole, benzimidazole, nitro compound, formaldehyde, acetylene alcohol, aliphatic and aromatic thiols and sulfide, sulfoxide, thiourea, acetylene alcohol, 2-mercaptobenzimidazole, amine or quaternary ammonium salts+halogen ions, acetylenethiol and sulfide, dibenzyl sulfoxide, alkylamine+potassium iodide, dicyclohexylamine nitrite, cyclohexylamine benzoate, benzotriazole, tannin+sodium phosphate, triethanolamine+lauroylsarcosine, +benzotriazole, and alkylamine+benzotriazole+sodium nitrite+sodium phosphate.

Examples of the ultraviolet absorber/photostabilizer include ultraviolet absorbers/photostabilizers, such as 2-(5-methyl-2-hydroxyphenyl)benzotriazole, 2-[2-hydroxy-3,5-bis($\alpha,\alpha$-dimethylbenzyl)phenyl]-2H-benzotriazole, 2-(3-t-butyl-5-methyl-2-hydroxyphenyl)-5-chlorobenzotriazole, 2-(2'-hydroxy-5'-t-octylphenyl)benzotriazole, condensates of methyl-3-[3-t-butyl-5-(2H-benzotriazol-2-yl)-4-hydroxyphenyl]propionate-polyethylene glycol (molecular weight: about 300), hydroxyphenylbenzotriazole derivatives, 2-(4,6-diphenyl-1,3,5-triazin-2-yl)-5[(hexyl)oxy]-phenol, and 2-ethoxy-2'-ethyl-oxalic acid bisanilide.

Examples of the antifungal agent/antibacterial agent include antifungal agents/antibacterial agents, such as 2-(4-thiazolyl)benzimidazole, sorbic acid, 1,2-benzisothiazolin-3 one, (2-pyridylthio-1-oxide) sodium, dehydroacetic acid, 2-methyl-5-chloro-4-isothiazolone complex, 2,4,5,6-tetrachlorophthalonitrile, methyl 2-benzimidazole carbamate, 1-(butylcarbamoyl)-methyl 2-benzimidazole carbamate, mono or dibromocyanoacetamides, 1,2-dibromo-2,4-dicyanobutane, 1,1-dibromo-1-nitropropanol, and 1,1-dibromo-1-nitro-2-acetoxypropane.

Examples of the organism adhesion preventing agent include organism adhesion preventing agents such as tetramethylthiuram disulfide, bis(N,N-dimethyldithiocarbamic acid)zinc, 3-(3,4-dichlorophenyl)-1,1-dimethylurea, dichloro-N-((dimethylamino)sulfonyl)fluoro-N—(P-tolyl) methanesulfenamide, pyridine-triphenylborane, N,N-dimethyl-N'-phenyl-N'-(fluorodichloromethylthio)sulfamide, copper(I) thiocyanate, cuprous oxide, tetrabutylthiuram disulfide, 2,4,5,6-tetrachloroisophthalonitrile, zinc ethylenebisdithiocarbamate, 2,3,5,6-tetrachloro-4-(methylsulfonyl) pyridine, N-(2,4,6-trichlorophenyl)maleimide, bis(2-pyridinethiol-1-oxide)zinc salts, bis(2-pyridinethiol-1-oxide)copper salts, 2-methylthio-4-t-butylamino-6-cyclopropylamino-s-triazine, 4,5-dichloro-2-n-octyl-4-isothiazolin-3-one, furanones, alkylpyridine compounds, gramine-based compounds, and isotonyl compounds.

Examples of the deodorizer include deodorizers, for example, organic acids such as lactic acid, succinic acid, malic acid, citric acid, maleic acid, malonic acid, ethylenediaminepolyacetic acid, alkane-1,2-dicarboxylic acid, alkene-1,2-dicarboxylic acid, cycloalkane-1,2-dicarboxylic acid, cycloalkene-1,2-dicarboxylic acid, and naphthalenesulfonic acid; fatty acid metals such as zinc undecylenate, zinc 2-ethylhexanoate, and zinc ricinoleate; metal compounds such as iron oxide, iron sulfate, zinc oxide, zinc sulfate, zinc chloride, silver oxide, copper oxide, metal (iron, copper, etc.) chlorophyllin sodium, metal (iron, copper, cobalt, etc.) phthalocyanine, metal (iron, copper, cobalt, etc.) tetrasulfonic acid phthalocyanine, titanium dioxide, and visible light-responsive titanium dioxide (nitrogen-doped type, etc.); cyclodextrins such as $\alpha$-, $\beta$-, or $\gamma$-cyclodextrin, methyl derivatives thereof, hydroxypropyl derivatives, glucosyl derivatives, and maltosyl derivatives; and porous materials, for example, acrylic acid-based polymers such as porous methacrylic acid polymers and porous acrylic acid polymers, aromatic polymers such as porous divinylbenzene polymers, porous styrene-divinylbenzene-vinylpyridine polymers, and porous divinylbenzene-vinylpyridine polymers, copolymers thereof, chitin, chitosan, activated carbon, silica gel, activated alumina, zeolite, and ceramics.

Examples of the pigment include pigments such as carbon black, titanium oxide, phthalocyanine-based pigments, quinacridone-based pigments, isoindolinone-based pigments, perylene or perynine-based pigments, quinophthalone-based pigments, diketopyrrolo-pyrrole-based pigments, dioxazine-based pigments, disazo-condensed-based pigments, benzimidazolone-based pigments and the like.

Examples of the flame retardant include flame retardants such as decabromobiphenyl, antimony trioxide, phosphorus-based flame retardants, aluminum hydroxide and the like.

Examples of the antistatic agent include antistatic agents, for example, quaternary ammonium salt type cationic surfactants, betaine type amphoteric surfactants, alkyl phosphate type anionic surfactants; cationic surfactants such as primary amine salts, secondary amine salts, tertiary amine salts, quaternary amine salts, and pyridine derivatives; anionic surfactants such as sulfated oil, soap, sulfated ester oil, sulfated amide oil, sulfated ester salts of olefins, fatty alcohol sulfuric acid ester salts, alkylsulfuric acid ester salts, fatty acid ethyl sulfonic acid salts, alkylnaphthalene sulfonic acid salts, alkylbenzene sulfonic acid salts, succinic acid ester sulfonic acid salts, and phosphoric acid ester salts; nonionic surfactants such as partial fatty acid esters of polyhydric alcohols, ethylene oxide adducts of fatty alcohols, ethylene oxide adducts of fatty acids, ethylene oxide adducts of fatty amino or fatty acid amides, ethylene oxide adducts of alkylphenols, ethylene oxide adducts of partial fatty acid esters of polyhydric alcohols, and polyethylene glycol; and amphoteric surfactants such as carboxylic acid derivatives and imidazoline derivatives.

When the water- and oil-repellent coating composition of the present invention contains various additives, the content of various additives is, for example, 0.01 to 70% by mass %, preferably 0.05 to 50% by mass, more preferably 0.1 to 30% by mass, and still more preferably 0.5 to 5% by mass, based on the total weight of the water- and oil-repellent coating composition of the present invention.

Lubricants, fillers, plasticizers, nucleating agents, antiblocking agents, foaming agents, emulsifiers, brightening agents, binders and the like may be contained in the water- and oil-repellent coating composition of the present invention.

Spray coating for obtaining the coating film of the present invention can be realized by using, for example, a spray coater (API-40 RD advance) manufactured by API Corporation, and preferable conditions are, for example, a scanning speed of 500 to 700 mm/sec, a pitch of 3 to 7 mm, a liquid amount of 4 to 8 cc/min, atomizing air of 250 to 450 kPa, and a gap 60 to 80 mm.

The pretreatment conditions of the substrate suitable for obtaining the coating film of the present invention include dipping the substrate in an aqueous 8 to 12% by mass sodium hydroxide solution, performing ultrasonic cleaning for 15 to 25 minutes, rinsing with pure water, and thoroughly drying so that no moisture remains on the surface.

The conditions after spray coating are not particularly limited and, after film formation by spray coating, the coating film is left to stand in the air at room temperature, and then dried with heating at 50 to 300° C., and preferably 100 to 200° C., for about 10 to 60 minutes, thus making it possible to obtain a coating film of the present invention.

The substrate that forms the coating film of the present invention is not particularly limited and may be composed of either an organic material or an inorganic material, and the substrate may be in the form of a flat surface or a curved surface. Examples of the organic material include thermoplastic resins such as an acrylic resin, a polycarbonate resin, a polyester resin, a styrene resin, an acrylic-styrene copolymer resin, a cellulose resin, and a polyolefin resin; and thermosetting resins such as a phenol resin, a urea resin, a melamine resin, an epoxy resin, an unsaturated polyester, a silicone resin, and a urethane resin. Examples of the inorganic material include metals such as iron, silicon, copper, zinc, and aluminum, alloys containing these metals, ceramics, and glass.

The substrate may be subjected to an easy adhesion treatment in advance. Examples of the easy adhesion treatment include hydrophilization treatments such as a corona treatment, a plasma treatment, and an ultraviolet-ray treatment. A primer treatment with a resin, a silane coupling agent, a tetraalkoxysilane or the like may also be used.

The transparent coating film of the present invention is industrially useful since it can be suitably used in display devices such as touch panel displays, optical elements, semiconductor elements, building materials, nanoimprint technique, solar batteries, window glasses of automobiles and buildings, metal products such as cooking tools, ceramic products such as tablewares, and automobile parts made of plastic. It can also be used for fishing nets, insect repository, aquarium and the like. Furthermore, it can be used for various indoor facilities such as kitchen, bathroom, washbasin, mirror, articles of various members around the toilet, china ceramics such as chandeliers and tiles, artificial marble, air conditioner and the like. It can also be used as an antifouling treatment for jigs, inner walls, piping and the like in factories. It is also suitable for goggles, eyeglasses, helmets, slot machine (Pachinko), fibers, umbrella, play equipment, soccer balls and the like. Furthermore, it can be used as an anti-adhesion agent for various packaging materials, such as food packaging material, cosmetic wrapping material, and pot interior.

EXAMPLES

The present invention will be more specifically described by way of Examples. It is to be understood that the present invention is not limited to the following Examples, and various design variations made in accordance with the purports mentioned hereinafter are also included in the technical scope of the present disclosure.

By the method mentioned in Synthesis Examples 1 and 2 of JP 2014-15609 A, a compound (molecular weight: about 8,000) represented by the following formula (a) was synthesized.

[Chemical Formula 11]

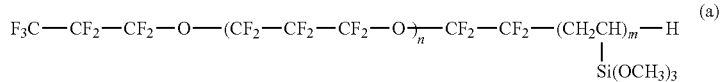

(a)

In the formula (a), n is 43 and m is an integer of 1 to 6.

Example 1

A compound represented by the above formula (a) (hereinafter referred to as the compound (a)) as the compound (A), FAS9E ($C_4F_9$—$C_2H_4$—Si—$(OC_2H_5)_3$, boiling point: 241° C., manufactured by Tokyo Chemical Industry Co., Ltd.) as a fluoroalkylsilane (B1), and FC-3283 (Fluorinert, manufactured by 3M Company) as a main solvent were mixed, followed by stirring at room temperature for a predetermined time to obtain a water- and oil-repellent coating composition. In the water- and oil-repellent coating composition, the proportion of the compound (A) is 0.1% by mass and the proportion of the fluoroalkylsilane (B1) is 0.2% by mass. The thus obtained water- and oil-repellent coating composition was applied on a glass substrate EAGLE XG manufactured by Corning Inc. subjected to a pretreatment using a spray coater manufactured by API Corporation, and then dried with heating at 150° C. for 30 minutes to obtain a transparent coating film on the glass substrate. As the pretreatment, the glass substrate was immersed in an aqueous 10% by mass water- and oil-repellent sodium hydroxide aqueous solution, subjected to ultrasonic cleaning for 20 minutes, rinsed with pure water, and then thoroughly dried such that no moisture remained. The spray coating was performed under the conditions of a scanning speed of 600 mm/sec, a pitch of 5 mm, a liquid amount of 6 cc/min, an atomizing air of 350 kPa, and a gap of 70 mm.

Example 2

In the same manner as in Example 1, except that HT-230 (perfluoropolyether compound, boiling point: 230° C., manufactured by Solvay, represented by the following formula (8)) was further used as a fluorine-based solvent (D) and the content was set at 0.3% by mass, a coating film was obtained.

[Chemical Formula 12]

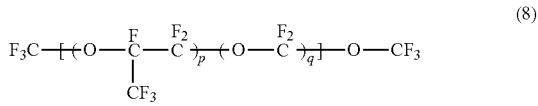

(8)

Example 3

In the same manner as in Example 2, except that the concentration of HT-230 was changed to 0.2% by mass, a coating film was obtained.

Comparative Example 1

In the same manner as in Example 1, except that the same glass substrate as in Example 1 was rotated at 3,000 rpm for 20 seconds using a spin coater manufactured by MIKASA Corporation and FAS9E was not used, the coating composition was applied on the glass substrate. The coating composition was further dried with heating at 150° C. for 10 minutes to obtain a coating film on the glass substrate.

The coating films obtained in Examples 1 to 3 and Comparative Example 1 were evaluated by the following methods.

(1) Measurement of Film Thickness

An X-ray reflectance measurement device (SmartLab) manufactured by Rigaku Corporation was used for measurement. A 45 kW X-ray generator, a wavelength λ=0.15418 nm of CuKα ray by a Cu target or a wavelength λ=0.15406 nm of CuKα1 ray was used as an X-ray source. A monochromator was not used or a Ge (220) monochrome crystal was used. As the setting conditions, the sampling width was set at 0.01° or 0.002°, and the investigation range was set at 0.0 to 2.5° or 0.0 to 1.6°. Then, the measurement was performed under the above setting conditions and the reflectance measurement value was obtained. The thus obtained measurement values were analyzed by analysis software (GlobalFit) manufactured by the same company.

(2) Measurement of Contact Angle

Using DM 700 manufactured by Kyowa Interface Science Co., Ltd., the contact angle of water and oil on a surface of a coating film was measured by the droplet method (analysis method: θ/2 method). The amount of the water droplet is 3.0 μL and the amount of the oil droplet is 3.0 μL. Hexadecane was used as the oil.

(3) Measurement of Contact Angle Hysteresis and Sliding Angle

Using DM700 manufactured by Kyowa Interface Science Co., Ltd., dynamic water repellency and oil repellency (contact angle hysteresis, sliding angle) of a surface of a coating film were measured by a sliding method (analytical method: contact method, water droplet amount: 6.0 μL, oil droplet amount: 4.0 μL, inclination method: continuous gradient, sliding detection: after sliding, movement judgment: advancing contact angle, sliding judgment distance: 0.125 mm). Hexadecane was used as the oil.

(4) Evaluation of Abrasion Resistance

Using a scratch apparatus equipped with an HB pencil with an eraser manufactured by MITSUBISHIPENCIL CO., LTD, an abrasion test was performed by moving a sample at 40 r/min under an applied load of 500 g in a state where the eraser is in contact with the sample. The contact angle was measured every abrasion of 100 times. The number of times of abrasion required for an initial contact angle to reach −15° or less was measured.

(5) Measurement of Sliding Speed of Water Droplet

20 μL of a water droplet was adhered to a test piece inclined at 32° and a speed at which the water droplet slides a distance of 3 cm down was measured using a micropipette.

(6) Measurement of Surface Roughness (Arithmetic Average Roughness Ra, Maximum Valley Depth Rv, Root Mean Square Roughness RMS)

In the measurement, a scanning probe microscope SPA 300 HV manufactured by Seiko Instruments Inc. was used. The measurement conditions are as follows.
Probe Station/Unit SPI4000/SPA300 HV
Cantilever: SI-DF 20
Scanner: 20 μm
Data type: Shape image
Observation mode: Dynamic force mode microscope (DFM)
Scanning area: 10,000 nm×10,000 nm
Scanning frequency: 0.25 Hz
Analysis software: (attached to measuring equipment)

A portion at least 5 mm inside or more from the end of a substrate was cleaved with an area of about 10 mm square to 20 mm square, which was used as a sample. Approximately the center of the sample was scanned with a width of 0.01 mm (10 μm). From the above observation field of view, the place was changed by about 0.3 mm, and each average of all five fields of view for all values of arithmetic mean roughness (Ra) and RMS was calculated.

(7) Measurement of Area Ratio of Convex Portion Cross-Sectional Area

An image of 100 μm² obtained by observing a surface of a coating film in the dynamic force mode (DFM) of a scanning probe microscope (SPM) was used for the measurement. This image was subjected to the primary inclination correction, the secondary inclination correction, and the flat correction, and the maximum valley depth (Rv) and RMS of the image after processing were calculated using a roughness analysis function.

The XY plane (XY plane including the lower end portion of the largest valley), in which the thickness direction of the coating film is the Z direction and $Z_0$ represented by the following formula (X1) is the Z axis value, is defined as the surface (average plane) of the coating film, and the XY plane in which Z represented by the following formula (X2) is the Z-axis value is defined as a cut surface, and thus an area ratio (%) of a cross-sectional area of the convex portion cut at the cut surface obtained by using the particle analysis function was measured.

$$Z_0(nm)=\{(R_v)^2\}^{1/2} \quad (X1)$$

$$Z(nm)=Z_0+2 \quad (X2)$$

(8) Measurement of Density of Outermost Surface

In the measurement, an X-ray reflectance measuring device (SmartLab) manufactured by Rigaku Corporation was used. A 45 kW X-ray generator was used as an X-ray source, a wavelength λ=0.15418 nm of CuKα ray by a Cu target or a wavelength λ=0.15406 nm of CuKα1 ray was used, and a monochromator is not used or a Ge(220) monochrome crystal was used. Regarding the setting conditions, a sampling width was set at 0.01° or 0.002°, a scanning range was set at 0.0 to 2.5° or 0.0 to 1.60°. Then, the measurement was performed under the above setting conditions to obtain a reflectance measurement value. The thus obtained measurement value was analyzed using analysis software (GlobalFit) of the same company.

With respect to Examples 1 to 3 and Comparative Example 1, the measurement results of the above items (1) to (6) are shown in Table 1, the results of the above item (7) are shown in Table 2, and the results of the above item (8) are shown in Table 3.

TABLE 1

| | | | | Example 1 | Example 2 | Example 3 | Comparative Example 1 |
|---|---|---|---|---|---|---|---|
| Composition of liquid | Compound (A) | Compound (a) | % by mass | 0.1 | 0.1 | 0.1 | 0.1 |
| | Fluoroalkylsilane (B1) | FAS9E | % by mass | 0.2 | 0.2 | 0.2 | — |
| | Fluorine-based solvent (D) | HT-230 | % by mass | — | 0.3 | 0.2 | — |
| | Fluorine-based solvent (C) (main solvent) | FC-3283 | % by mass | 99.7 | 99.4 | 99.5 | 99.9 |

TABLE 1-continued

|  |  |  | Example 1 | Example 2 | Example 3 | Comparative Example 1 |
|---|---|---|---|---|---|---|
| Water | Initial contact angle | ° | 115.1 | 115.0 | 114.3 | 113.5 |
|  | Hysteresis | ° | 10.9 | 7.7 | 9.1 | 11.5 |
|  | Sliding angle | ° | 24.3 | 18.0 | 16.0 | 24.3 |
| Oil (hexadecane) | Initial contact angle | ° | 65.9 | 65.9 | 65.9 | 64.9 |
|  | Hysteresis | ° | 4.9 | 1.9 | 4.2 | 7.4 |
|  | Sliding angle | ° | 8.7 | 7.3 | 8.7 | 13.7 |
| Abrasion resistance test |  | Times | 2,700 | 5,500 | 4,000 | 2,000 |
| Water sliding speed |  | cm/second | 6.8 | 13.1 | 15.1 | x |
| Surface roughness | Ra | nm | 0.4 | 0.3 | 0.6 | 1.6 |
|  | P-V | nm | 38.0 | 43.4 | 47.4 | 43.6 |
|  | RMS | nm | 0.9 | 0.6 | 1.3 | 3.5 |
| Thickness |  | nm | 4.8 | 5.0 | 5.0 | 5.2 |

In Examples 1 to 3 of the present invention, which satisfy the requirements of RMS, the time of the abrasion resistance test exceeds 2,000 times and the abrasion resistance is excellent as compared with Comparative Example 1 which does not satisfy the requirements. In the coating film of Comparative Example 1, the water droplets did not slide in the measurement of the sliding speed. Meanwhile, in the costing films of Examples 1 to 3, the water droplets slid at a high speed of 5.0 cm/second or more. In Examples 2 and 3 in which both (B1) and the fluorine-based solvent (D) are contained together with the compound (A), the time of the abrasion resistance test is 4,000 times or more and the sliding speed of the water droplet is 10.0 cm/second or more, and the abrasion resistance was particularly excellent.

TABLE 2

|  |  | Example 1 | Example 2 | Example 3 | Comparative Example 1 |
|---|---|---|---|---|---|
| Average particle diameter* | nm | 51.6 | 59.3 | 82.89 | 267.0 |
| Number of particles | particles | 671.0 | 589.6 | 585.8 | 161.7 |
| Coating area ratio (AR) of convex portion | % | 1.4% | 1.5% | 3.2% | 6.9% |

*Average particle diameter means those obtained by averaging an equivalent circle diameter calculated from an area of each particle when a cross-section of the convex portion existing in the coating film, cut along the XY plane which is 2 nm higher than an average plane of a coating film in the Z axis direction, is called the particle.

In Examples 1 to 3 of the present invention, as compared to Comparative Example 1, the average particle diameter representing the size of the convex portion of the coating film surface is small and the coating area ratio (AR) of the convex portion is very narrow, e.g., 3.2% or less, and the coating film was excellent in smoothness.

TABLE 3

|  |  | Thickness of layer (nm) | Density (g/cm³) | Roughness* (nm) |
|---|---|---|---|---|
| Example 1 | Outermost surface | 3.4 | 1.74 | 0.4 |
|  | Substrate interface | 1.4 | 1.45 | 0.3 |
|  | Substrate surface | — | — | 0.6 |
| Example 2 | Outermost surface | 1.1 | 1.65 | 0.3 |
|  | Interior | 2.8 | 1.78 | 0.2 |
|  | Substrate interface | 1.1 | 1.28 | 0.2 |
|  | Substrate surface | — | — | 0.7 |
| Example 3 | Outermost surface | 1.1 | 1.64 | 0.3 |
|  | Interior | 2.8 | 1.77 | 0.1 |
|  | Substrate interface | 1.1 | 1.26 | 0.2 |
|  | Substrate surface | — | — | 0.7 |
| Comparative Example 1 | Outermost surface | 1.3 | 1.52 | 0.3 |
|  | Interior | 2.7 | 1.63 | 0.2 |
|  | Substrate interface | 1.2 | 1.20 | 0.3 |
|  | Substrate surface | — | — | 0.7 |

*Roughness means interface roughness (roughness) analyzed by the measurement results of X-ray reflectance.

As a result of the X-ray reflectance measurement, two or three layers having the same composition but having different densities were confirmed in the transparent coating films of Examples and Comparative Examples. When these three layers are regarded as a substrate interface layer, an inner layer, and an outermost layer in this order from the substrate side, interface roughness between the substrate interface layer and the substrate surface is shown in the column of "substrate surface" in Table 3, interface roughness between the inner layer and the substrate interface layer is shown in the column of "substrate interface", interface roughness between the outermost surface layer and the inner layer is shown in the column of "inner", and interface roughness between the air and the outermost surface layer is shown in the column of "outermost surface", respectively. Each density of the substrate interface layer, the inner layer, and the outermost surface (outermost surface of the coating film) layer is shown.

It is very difficult to compare the surface roughness of the coating film from the value of the surface roughness since the measurement value of the roughness is a very small numerical value (e.g., 0.5 nm or less) of the coating film of the present invention. However, it is possible to compare roughness of the outermost surface as coarseness and fineness of the outermost surface of the coating film. The transparent coating film of the present invention has higher density of the surface than the transparent coating film of Comparative Example. This shows that a coating film having small roughness and uniform thickness in the thickness direction is obtained. As mentioned above, it is considered that a coating film having a very smooth surface can be obtained, thus making it possible to obtain a coating film capable of realizing satisfactory sliding properties in addition to water repellency and oil repellency, and abrasion resistance.

The invention claimed is:
1. A fluorine-containing coating film comprising a perfluoropolyether structure,
wherein, the fluorine-containing coating film has a polysiloxane backbone and further has a structure in which a fluoroalkyl group is directly bonded to a silicon atom of the polysiloxane backbone,
wherein, the perfluoropolyether structure is derived from a perfluoropolyether structure in a compound (A) in which a group having a perfluoropolyether structure and a hydrolyzable group are bonded to a silicon atom,
wherein, the compound (A) is at least one of a compound represented by the following formula (1), the following formula (2) and a compound represented by the following formula (2'):

[Chemical Formula 1]

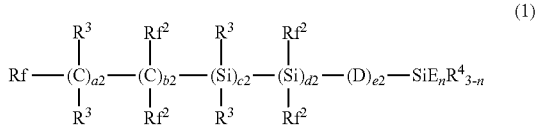

wherein, in formula (1), Rf represents a perfluoroalkyl group having 1 to 5 carbon atoms; $Rf^2$ represents a fluorine atom; D represents —O—; E each independently represents a methoxy group, an ethoxy group, or a chlorine atom; a2, c2, and d2 each is 0, b2 is an integer of 20 or more and 600 or less, e2 is an integer of 4 or more and 600 or less; an order of each repeating unit enclosed in parentheses attached with b2 and e2 is arbitrary in the formula; and n is 3;

[Chemical Formula 2]

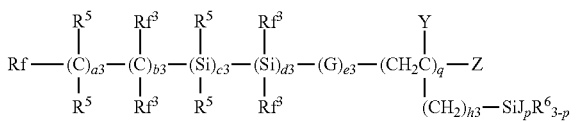

[Chemical Formula 3]

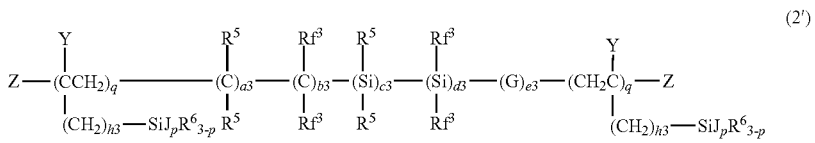

wherein, in formula (2) and (2'), Rf represents a perfluoroalkyl group having 1 to 5 carbon atoms, $Rf^3$ represents a fluorine atom; G represents —O—; J each independently represents a methoxy group, an ethoxy group, or a chlorine atom; a3, c3, and d3 each is 0, b3 is an integer of 20 or more and 600 or less, e3 is an integer of 4 or more and 600 or less, h3 is 0 or more and 1 or less, q is an integer of 1 or more and 20 or less; an order of each repeating unit enclosed in parentheses attached with b3 and e3 is arbitrary in the formula; and p represents 3;

wherein, the fluoroalkyl group is derived from a fluoroalkyl group in a fluoroalkylsilane (B1) in which a hydrolyzable group is bonded to a silicon atom of a fluoroalkylsilane, wherein, the fluoroalkylsilane (B1) is a compound represented by the following formula (3):

[Chemical Formula 4]

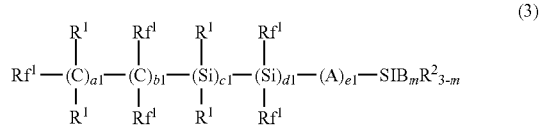

wherein, in formula (3), $Rf^1$ each independently represents a fluorine atom or a perfluoroalkyl group having 1 to 5 carbon atoms; $R^1$ represents a hydrogen atom; B each independently represents a methoxy group or an ethoxy group; a1 is 1 to 5, b1 is 0 to 5, and each of c1, d1, and e1 is 0; an order of each repeating unit enclosed in parentheses attached with a1 and b1 is arbitrary in the formula; m is 3;

wherein, the fluorine-containing coating film has a root mean square roughness RMS of less than 3.5 nm.

2. The fluorine-containing coating film according to claim 1, which has a thickness of 4 nm or more and 100 nm or less.

3. The fluorine-containing coating film according to claim 1, wherein a sliding angle of 6 μL of a water droplet is 24.3° or less, or a speed of 20 μL of a water droplet sliding on a coating film inclined at 32° is 0.1 cm/second or more.

4. The fluorine-containing coating film according to claim 1, wherein a density of an outermost surface layer of the fluorine-containing coating, film measured by an X-ray reflectivity method is 1.6 g/cm³ or more.

5. The fluorine-containing coating film according to claim 1, which has an arithmetic average roughness Ra of 0.1 nm or more and 1 nm or less.

6. The fluorine-containing coating film according to claim 1, which has a polysiloxane backbone and has the perfluoropolyether structure on the free end side of a silicon atom of the polysiloxane backbone.

* * * * *